United States Patent [19]
Ramirez

[11] Patent Number: 5,262,677
[45] Date of Patent: Nov. 16, 1993

[54] REACTOR SUBSYNCHRONOUS TUNING SCHEME

[76] Inventor: Alberto R. Ramirez, Borges 1862 Cipolletti, Rio Negro (8324), Argentina

[21] Appl. No.: 782,291

[22] Filed: Oct. 24, 1991

[51] Int. Cl.$^5$ .............................................. H02H 7/06
[52] U.S. Cl. ................................... 307/105; 307/102; 361/20; 333/175; 333/176
[58] Field of Search ...................... 333/176, 175, 181; 330/76; 361/20; 307/105, 102

[56] References Cited

U.S. PATENT DOCUMENTS

| | | | |
|---|---|---|---|
| 1,708,950 | 5/1925 | Norton | 330/76 |
| 3,745,416 | 7/1973 | Thanauala | 333/176 |
| 3,813,593 | 5/1974 | Tice et al. | 333/176 |
| 3,881,137 | 4/1975 | Thanauala | 333/176 |
| 3,944,846 | 3/1976 | Thompson et al. | 307/129 |
| 4,268,758 | 5/1981 | Grassmann | 307/105 |
| 4,438,386 | 3/1984 | Gyugyi | |
| 4,513,243 | 4/1985 | Novak et al. | |
| 4,551,780 | 11/1985 | Canay | 361/113 |
| 4,607,217 | 8/1986 | Bhargava | |
| 4,795,990 | 1/1989 | Ishikawa et al. | 333/176 |
| 4,808,843 | 2/1989 | Hedin | 307/105 |
| 4,843,513 | 6/1989 | Edris | 361/20 |

OTHER PUBLICATIONS

*IEEE Transactions* PAS-99, pp. 1810–1818 Sep./Oct. 80; IEEE Subsynchronous Resonance Working Group; "Countermeasures to Subsynchronous Resonance Problems".
*IEEE Paper* 91SM350-9 PWRS; IEEE Subsynchronous Resonance Working Group; "Readers Guide to Subsynchronous Resonance".
*Siemens Energy & Automation Technology;* Mar. 1986 Hingorant et al., pp. 7–10 "NGH Damping Device Solves Subsynchronos Resonance Problem".

*Primary Examiner*—Steven L. Stephan
*Assistant Examiner*—Ben Davidson

[57] ABSTRACT

A scheme for counteracting subsynchronous resonance in an AC power system that comprises a passive device in combination with a line inductive shunt reactor (L10). The device is connected from the neutral end (N) of the reactor (L10) to ground and comprises a plurality of circuit branches: one of those branches comprises a condenser (C10), another one includes an inductor (L12) in series with at least one tank circuit (C14, L14). The combination of these elements results in circuit paths from the AC line to ground of selected admittance values for at least one selected frequency as well as in a solid grounding of the shunt reactor neutral at synchronous frequency.

5 Claims, 2 Drawing Sheets

REACTOR SUBSYNCHRONOUS TUNING SCHEME

BACKGROUND

1. Field of Invention

This invention relates to a scheme designed for counteracting subsynchronous resonance (SSR) phenomena in an AC power system comprising neutralizing the undesired SSR currents by means of a passive shunt device.

2. Description of Prior Art

In its most common form, SSR is a critical condition that can be reached by a subsynchronous frequency oscillation (SSO), this is a phenomenon in which the torsional system of a power plant prime-mover shaft interchanges energy with a series-compensated transmission network via the generator air gap, at one or more natural frequencies of the combined system.

Various SSR Countermeasures are known to the industry, the IEEE Power Engineering Society's SSR Working Group in its Transaction paper PAS-99 of Sep/Oct 80 entitled 'Countermeasures to Subsynchronous Resonance Problems', and later in its recent paper 91 SM350-9 PWRS 'Readers's Guide to Subsynchronous Resonance' presents an updated list of countermeasure concepts proposed or applied.

In practice, a leading option has been found on 'dynamic' or 'active-type' means i.e. RL devices switched with back-to-back thyristor firing control. The 'Static Var Generator' (also known as 'Dynamic Stabilizer'), U.S. Pat. No. 4,438,386 to Gyugyi is an example of this approach.

A number of disadvantages of this apparatus can be listed as follows:

a) cost;
b) involves many components;
c) utilizes sophisticated detection and control means;
d) requires a non-standard transformer fabrication (U.S. Pat. No. 4,513,243 to Novak et al.);
e) thyristor switching produces undesired harmonics that lower the quality of the power supply;
f) its location at generator or step-up transformer terminals where short-circuit power duty is near maximum, minding b) it becomes clear the overall system reliability deterioration;
g) it can control a single SSR frequency at a time.

Another major active-type countermeasure is the so called 'NGH Scheme' or thyristor switched resistor which has many of the forementioned disadvantages such as: a), b), c) (here a U.S. Pat. No. 4,607,217 to Bhargava indicates the detection means used in this scheme), e),and g) plus the fact that all this bulky equipment must be placed onto the Extra-High-Voltage (EHV)-insulated platform together with the series capacitor installation making the substation layout and wiring congested.

Insofar as passive filters are concerned, the cited IEEE references discuss or mention three types:

a) Static Blocking Filter (Navajo Filter);
b) Line Filter;
c) Parallel Filter;

b) and c) are only theoretical and consist of RLC elements connected in parallel with the capacitor bank either to block the SSR current as in b) or to by-pass the capacitor for a SSR frequency as in c). Neither one has ever been applied basically due to their substantial potential cost since they must be EHV-insulated apparatus of very low losses and one is required per SSR frequency. Conversely a) was applied at the Navajo Plant in northern Arizona; this is a series filter connected from the neutral end of the step-up transformer high side to save in insulation, yet requiring a non-standard design of such transformer, the filter is expensive since it must withstand both a severe short-circuit duty and full load, occupying besides considerable substation space due to its fairly large number of components.

It can be observed that no prior-art concept uses the principle of neutralizing the harmful subsynchronous currents by means of a shunt passive filter located in the EHV network.

A shunt filter element placed at an intermediate point 0 between the interacting generator and series capacitor (FIG. 1) has inherent potential properties to cope with SSR, some of which are listed below. Depending on system topology and number of frequencies in question, their effectiveness can be shown in a number of not mutually exclusive contexts such as:

a) the filter is a short circuit to ground at a given SSR frequency so as to completely decouple electrically the generator from the capacitor, breaking thus any possible energy interchange between them at that frequency.

b) the filter has, at a given SSR frequency, an admittance $Y_{OP}$ whose magnitude is the conjugate of the capacitor-branch apparent one $Y_{OU}$ as seen from the intermediate point 0, so that their parallel combination $(Y_{OP}+Y_{OQ})$ is nil or very small, forcing the subsynchronous current fed from the generator to be negligible;

c) still the filter has an admittance to ground at the concurrent supersynchronous frequency component so as to boost its always positive damping contribution at the common natural frequency of the generator's torsional oscillation.

One reason why this resourceful approach has never been formally attempted can be offered basically as follows: a self-standing shunt element in the system must present ideally zero admittance at synchronous frequency in order not to alter the AC supply. In a passive filter case this calls for an EHV-insulated parallel LC tank tuned at 60 Hz to block this frequency plus a 'bleeding' stage comprising additional LC components connected in series with that blocking unit to render the required overall admittance at the SSR frequency.

A major drawback of this scheme lays in the fact that an EHV shunt capacitor is not a standard apparatus and moreover the filter-assembly MVA rating, plus its stringent design for low steady-state losses and attendant protective switchgear, turn it absolutely unfeasible from a cost standpoint.

SUMMARY OF THE INVENTION

Series-compensated EHV transmission lines are basically with no exception also shunt compensated for its capacitive charging by means of inductive shunt reactors. These apparatus are known to be designed for low losses, typically with quality factors of about 400 at synchronous frequency; for a subsynchronous frequency the apparent resistance decreases further due to the quasi-quadratic reduction in iron losses derived from a lower frequency.

This is one of the key principles to this invention, the fact that an EHV reactor can be utilized effectively as a filter component for free, dispensing furthermore the need for a synchronous frequency blocking stage. This is enabled with a subsynchronous tuning device, introduced in this patent application and connected from the reactor's neutral end to ground, meeting the following:

a) The device has a capacitive response at the troublesome SSR frequencies so as to attain, in combination with the shunt reactor, circuit paths from the AC line to ground of selected admittance magnitude;

b) The device is a short circuit at synchronous frequency such that the shunt reactor neutral is solidly grounded.

DESCRIPTION OF THE PREFERRED EMBODIMENTS

Figure 1:
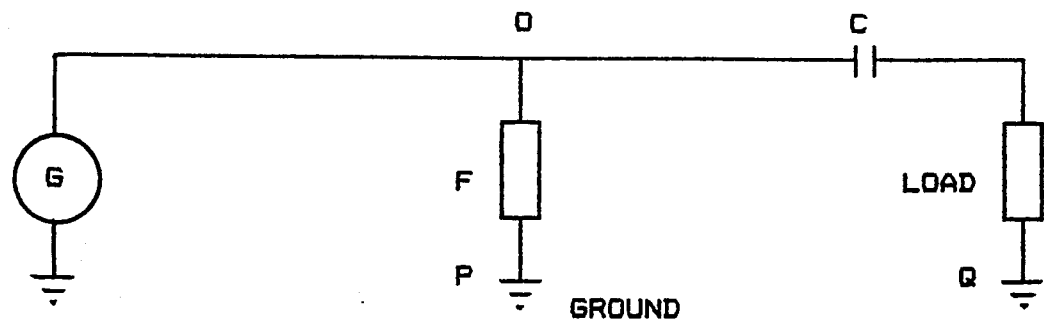
Figure 2:
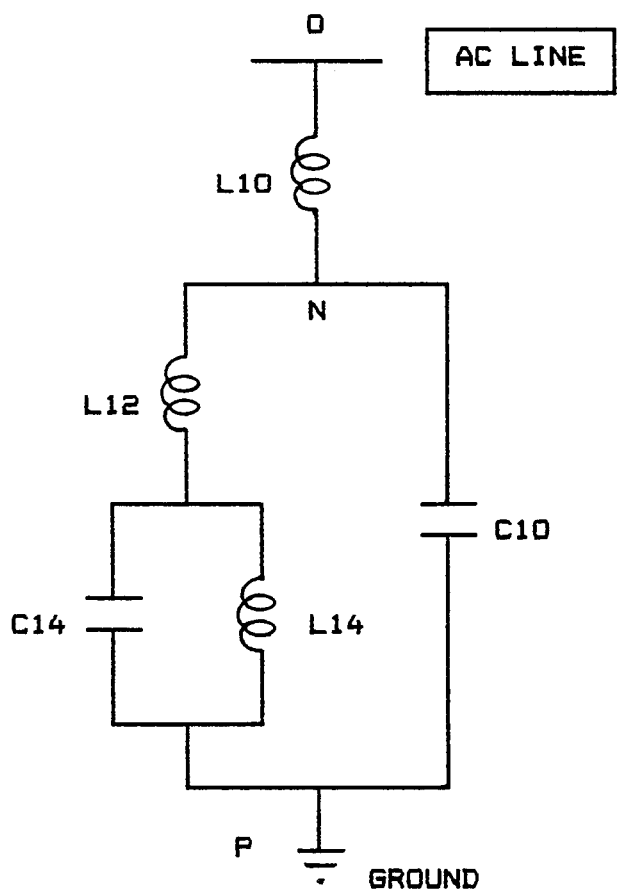
FIG. 2 depicts a one-line diagram of a circuit embodying the present invention as it applies to neutralize the current of at least one subsynchronous frequency.

FIG. 2 shows two parallel branches, both connected from the neutral end N of an inductive shunt reactor L10 to ground: one having a condenser C10 and the other having an inductor L12 in series with a tank circuit (C14,L14).

Figure 3:
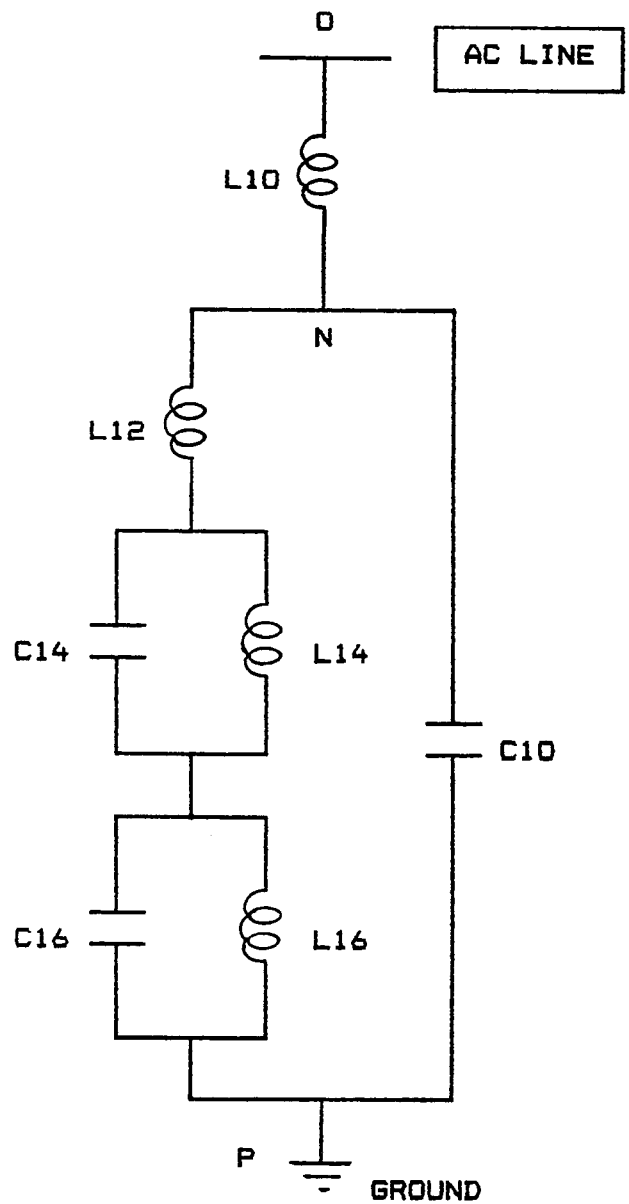
FIG. 3 depicts a one-line diagram of another circuit embodying the present invention as applied to neutralize the currents of at least two subsynchronous frequencies.

FIG. 3 shows two parallel branches connecting the neutral N of an inductive shunt reactor L10 to ground: one having a condenser C10 and the other having an inductor L12 in series with two tank circuits, (C14,L14) and (C16,L16), in series.

OPERATION OF THE PREFERRED EMBODIMENTS

Regarding the embodiment of FIG. 2, the tank circuit (C14,L14) is tuned for parallel resonance at one selected subsynchronous frequency such that its branch becomes an open circuit to ground; condenser C10 is designed for series combination with L10 at the same forementioned frequency configuring thus a circuit path from the AC line to ground having a selected admittance. Inductor L12 is designed for series resonance with the tank circuit (C14,L14) at synchronous frequency such that this branch becomes a short circuit to ground.

Regarding the embodiment of FIG. 3, the tank circuit (C14,L14) is tuned for parallel resonance at one selected subsynchronous frequency such that its branch becomes an open circuit to ground; condenser C10 is designed for series combination with L10 at the same forementioned frequency, configuring thus a circuit path having a selected admittance from the AC line to ground; the second tank circuit (C16,L16) is designed such that for a given second frequency the admittance of the series branch (L12), (C14,L14), (C16,L16), in parallel with C10 yields an equivalent capacitor such that its series combination with L10 attains a selected admittance at the forementioned second frequency. Inductor L12 is designed for series resonance with the tank-circuit tandem (C14, L14) and (C16,L16) at synchronous frequency such that this branch becomes a short circuit to ground.

In any event how admittance values are selected depends upon actual conditions for instance, if the reactor is located electrically far from the generator and close to the capacitor, it will seem proper to design the filter as a short circuit at the SSR frequency to fully by-pass the series compensation, as seen from the feeding point. Viceversa, for the reactor located near the generator it will be best to design the filter to have a suitable admittance to compensate for the capacitor current so as to yield a negligible resultant at the generation point, and/or to get the filter to operate as a supersynchronous short circuit to maximize the positive damping contribution that component brings about.

SUMMARY, RAMIFICATIONS, AND SCOPE

It should be apparent the present invention is capable of counteracting the harmful SSR activity in a power system. Furthermore it yields the following objects and advantages:

a) works under a basic operating principle and layout;

b) has only a few passive components, yet it can deal with more than one SSR frequency;

c) requires neither data acquisition nor supervisory control;

d) requires no feedback control;

e) has a simple installation causing no down time of either the power system or the resident substation equipment;

f) its steady-state losses are mainly the ones associated to the shunt reactor and therefore already accounted for;

g) adds a novel and useful function to a traditional power apparatus, i.e. the EHV shunt reactor; furthermore since the reactor tuner device is located at the neutral end of the line reactor;

h) requires minimal short-circuit duty design;

i) requires a low insulation level;

j) causes a minimum impact on the power system.

It can be gathered this invention constitutes a reliable and inexpensive scheme which can be assembled with few standard components of the distribution voltage class, in combination with a line shunt reactor apparatus.

Thus while the preferred embodiments of the invention have been illustrated herein, it is to be understood that changes and variations may be made by those skilled in the art without departing from the spirit and scope of appending claims. For instance an alternative would be to connect a LC series branch from the reactor neutral to ground so as to yield a zero reactance at synchronous frequency and a selected admittance at a SSR frequency. This would have the advantage of simplicity but possibly a considerable rating, etc.

What is claimed is:

1. Apparatus for counteracting subsynchronous oscillations in an AC power line operating at a synchronous frequency comprised of:

a) a first inductor having a high-voltage terminal connected to a tapping junction of said power line and a neutral terminal effectively grounded to a system ground potential at said synchronous frequency, b) a tuned circuit including a tank circuit serially inserted with said first inductor between said neutral terminal and said ground potential, said tuned circuit and said first inductor together forming at least one circuit path from said tapping junction to said ground potential serially resonant at a frequency below said synchronous frequency, said tuned circuit having a serial resonant frequency, said tuned circuit having a serial resonant frequency at said synchronous frequency providing a path of substantially nill impedance from said neutral terminal to said ground potential at said synchronous frequency.

2. The apparatus for counteracting subsynchronous oscillations of claim 1 wherein said tuned circuit comprises a plurality of parallel circuit branches.

3. The apparatus for counteracting subsynchronous oscillations of claim 2 wherein a first of said circuit branches comprises a first condenser.

4. The apparatus for counteracting subsynchronous oscillations of claim 2 wherein a second of said circuit branches comprises a second inductor and a second condenser connected in parallel and a third inductor serially connected with said second inductor and said second condenser.

5. The apparatus for counteracting subsynchronous oscillations of claim 1 wherein said tuned circuit comprises first inductive means connected in parallel with first capacitive means, second inductive means connected in parallel with second capacitive means, said first inductive means and said first capacitive means being serially connected with said second inductive means and said second capacitive means, said second capacitive means and said second inductive means being serially connected with third inductive means.

* * * * *